(12) United States Patent  
Collins

(10) Patent No.: US 9,635,800 B1  
(45) Date of Patent: May 2, 2017

(54) PASTURE AND PADDOCK TENDER

(71) Applicant: Ron Collins, Pelion, SC (US)

(72) Inventor: Ron Collins, Pelion, SC (US)

( * ) Notice: Subject to any disclaimer, the term of this patent is extended or adjusted under 35 U.S.C. 154(b) by 0 days.

(21) Appl. No.: 15/160,229

(22) Filed: May 20, 2016

Related U.S. Application Data

(60) Provisional application No. 62/185,277, filed on Jun. 26, 2015.

(51) Int. Cl.

| | | |
|---|---|---|
| *A01B 31/00* | (2006.01) | |
| *A01B 43/00* | (2006.01) | |
| *A01B 35/04* | (2006.01) | |
| *A01C 3/04* | (2006.01) | |
| *A01C 3/06* | (2006.01) | |
| *A01C 3/08* | (2006.01) | |
| *A01K 23/00* | (2006.01) | |
| *A01K 1/01* | (2006.01) | |
| *B62B 15/00* | (2006.01) | |

(52) U.S. Cl.
CPC ............... *A01C 3/08* (2013.01); *A01C 3/04* (2013.01); *A01K 1/01* (2013.01); *A01K 23/005* (2013.01); *B62B 15/007* (2013.01)

(58) Field of Classification Search
CPC ......... A01B 31/00; A01B 43/00; A01B 35/04; A01K 1/0128; A01K 1/0132; A01C 3/04; A01C 3/06
See application file for complete search history.

(56) References Cited

U.S. PATENT DOCUMENTS

| | | | | |
|---|---|---|---|---|
| 3,409,120 A | * | 11/1968 | Huis | A01K 1/0132 119/451 |
| 4,850,433 A | * | 7/1989 | West | A01B 31/00 172/32 |
| 5,848,697 A | | 12/1998 | Eash | |
| 6,257,345 B1 | * | 7/2001 | Tozer | E01H 1/12 172/199 |
| 6,892,891 B2 | | 5/2005 | Dias | |
| 2005/0279850 A1 | | 12/2005 | Stabler et al. | |

* cited by examiner

*Primary Examiner* — Bryan Evans
(74) *Attorney, Agent, or Firm* — F Rhett Brockington

(57) ABSTRACT

The apparatus is a tender that removes horse manure from pastures and paddocks by collecting stools of manure, grinding the manure and returning it back to the pasture as fertilizer. The tender can also process collected manure, moving it and distributing it to locations needing biomass. The tender is a specialized sled, which can be towed by small vehicle, such as a golf cart. When towed through a pasture, the tender scrapes up the horse manure, grinds it into small granules without hurting the grass, and then spreads it over a wide elongate area, utilizing a unique knife and a partitioned mesh in a structural frame. The tender has a removable bed liner for that retains some or all materials, such as collected manure, for transporting the materials, where it can be dumped or be distributed as a granular biomass.

16 Claims, 9 Drawing Sheets

PASTURE AND PADDOCK TENDER

CROSS-REFERENCE TO RELATED APPLICATION

The present patent application/patent claims the benefit of priority of U.S. Provisional Patent Application No. 62/185,277, filed on Jun. 26, 2015, and entitled "A PASTURE AND PADDOCK TENDER," the contents of which are incorporated in full by reference herein.

BACKGROUND OF THE INVENTION

1. Field of the Invention

The invention relates generally to an apparatus and process for collecting, and, optionally, grinding and spreading the equine manure.

2. Background

A component of maintaining horses is ensuring that the area where they are kept and exercised, for example a pasture, is routinely cleaned so that the horses do not eat contaminated feed and grass. A contributing source to contamination can be droppings of equine manure, as the droppings—left untreated, can be a breeding location for flies and a growth location parasites and pathogens, in general. It has been found that good pasture management will virtually eliminate the potential for serious complications caused by parasitism. Parasites are primarily transferred through manure, and proper pasture management is critical. A major component of proper pasture management usually includes a combination of removing equine manure and spreading it after it has been broken down into fine granules. Removing manure is nominally a labor intensive process, wherein the manure is manually collected, using a pitch fork or shovel, into a barrow or similar enclosure, leaving most of the underlying pasture grass. Grinding is nominally a separate process that enables the manure to be quickly incorporated into the soil and the roots of the grass.

A paddock, which is a small, usually enclosed field near a stable or barn for pasturing or exercising animals can have a high concentration of equine manure, and have a high potential for cross-contamination. An apparatus that can quickly collect the equine manure would advantageously mitigate cross-contamination.

Historically, a mechanism of sequestering carbon in the soil has been to grow cover crops, and then till the crop back into the soil. A newer technique, No-till farming, utilizes collected and ground manure to be spread over the soil, however the collection typically cuts or collects the grass in the process of collecting the manure. Nominally, the equipment utilizes expensive sweeping types of machines and the collected material requires further processing. An apparatus that selectively grinds and spreads the equine manure, without cutting the grass, would affect No-till farming.

SUMMARY OF THE INVENTION

The invented apparatus is a paddock and pasture tender, wherein the invented tender is a multifunctional, low maintenance sled-like farm implement, which can be used to carry material over fields with only incidental impact to the grass. The tender is typically light enough in weight that it can be towed by a light duty vehicle, such as a golf-cart, an ATV, or a small tractor at less than 25 mph.

The tender has unique properties, especially when the material is equine manure. An aspect of the tender is that when it is towed across the ground (for example a pasture, a paddock, a dirt track, or a field), the moving tender efficiently collects piles of equine manure without cutting the grass as it slides over one or more piles of manure. The collected manure can be conveyed to another location, where the manure can be discharged, or, alternatively the bottom of the tender can be configured to grind the equine manure into a granular material, which is then distributed over an elongate surface area, where it in a diminutive state can quickly migrate into the soil.

The tender itself does not require any power elements, such as thrashers, brushes, augers, heaters, blowers. Operationally, the static elements of the tender are energized by the movement of the towed tender, therein enabling the static elements to energetically separate the manure from grass, and through a cyclic series of attrition steps which sift and grind the collected manure into a fine granular material, that is then spread over a large surface area.

The tender can collect a percentage of the manure, for example to carry the manure to another area, and/or spread a percentage of the manure as granular material.

The apparatus has a substantially rectangular robust frame on sled runners. The frame includes a left side, a right side, a front side, a rear side, a bottom side and an open top side. A right bottom forward edge of the right side panel and a left bottom forward edge of the left side panel an upward curvature. The left runner and the right runner are connected to the bottom edges of the left and right side panels, respectively. Both runners have a straight portion and a forward portion that curves upward following the curvature of the bottom forward edge of the left side panel and the right side panel. The forward portion of the left and right runners are similar to the tip of a ski, imparting lift and promoting planing over projecting rocks, etc.

A horizontal strength element spans from a forward top edge of the left side panel to a forward top edge of the right side panel, therein providing support for the left and right elongate structural flat side panels. The horizontal strength element strengthens the front side of the apparatus, and additionally functions as a forward guard for a blade. The horizontal strength element has a left side eyebolt through which passes a left sectional length of a flexible strength element, wherein the flexible strength element is nominally a chain, a chord or a cable. A rearward end of the left sectional length of the flexible strength element is connected to a left side fastening means on the left side panel. The left angle between the left side eyebolt and the left side fastening means is acute. Likewise, the horizontal strength element has a right side eyebolt through which passes a right section length of the flexible strength element, wherein a rearward end of the right sectional length of the flexible strength element is connected to a right side fastening means on the right side panel. The right angle between the right side eyebolt and the right side fastening means is also acute.

The left and right sectional lengths are comparable in length, and the apparatus is towed by both right and left flexible strength elements, wherein a draw angle is close to being about parallel to the ground.

Rearward of the horizontal strength element there is a forward horizontal multi-functional bar, which spans from the left runner to the right runner. The forward horizontal multi-functional bar includes a leading edge portion that functions as a heavy duty blade. The leading edge portion of the heavy duty blade has a rounded edge selected so that when towed across grass, the grass bends instead of being cut. A trailing edge portion of the forward horizontal multi-functional bar provides a forward support element for the bottom side.

The rear side of the rectangular robust frame includes a set of horizontal and vertical bars. The horizontal rearward bars span from the left side to the right side, and are further supported by at least one upright bar, that functions as a stanchion, providing support to the horizontal rearward bars.

The metal mesh supported by the rectangular robust frame and a set of partitioning elements. The supported metal mesh is substantially flat, but it still has some vertical flex, which is evident as the tender is towed. The mesh size is selected to grind collected equine manure into small pieces as the manure is picked up by the blade or the metal mesh. Collected manure is lifted off the ground onto an upper side of the mesh either by the blade or through the metal mesh as the apparatus is towed along the ground. Nominally the mesh is rectangular in shape, wherein a shorter side of a rectangle is parallel to the left and right runners, and a longer side of the rectangle is parallel to the forward horizontal multi-functional bar of the tender. A heavy gauge wire rod mesh that is about 2"×4" has been found to work.

The mesh retains collected manure on the upper side of the mesh until the manure breaks apart caused by the flexing movement of the towed apparatus; and once the manure is small enough to pass through the mesh, the manure is then ground into much smaller granules caught between the ground and an bottom side of the mesh bottom side. Much of the fine grinding is a result of the mesh's shearing action as to moves across the ground.

A left side length and a right side length of a perimeter of the mesh is attached to the left and right runners. A front side length of the perimeter is in abutment with a rear edge of the forward horizontal multi-functional bar, and a rear side length of the perimeter of the mesh is in abutment with a front edge of the lowest horizontal rearward bar of the set of horizontal and vertical bars.

The bottom side of the tender includes at least one overlying supporting element, which limits the mesh from flexing upward. The at least one overlying supporting element partitions the bottom side into at least two sectional spaces, where each sectional space defines a rectangular portion of the mesh that can be covered with a removable sectional bed liner. When all of the sectional spaces are filled with the removable sectional bed liner, then the tender has a complete bed-liner. The complete bed-liner is excellent for moving materials around a farm and even within a large barn. With the complete bed-liner in place the tender can be used to collect leaves, pecans, straw, and to move materials and implements around.

An aspect of the removable sectional bed liner is that it is secured in a sectional space with a dual purpose long pin, wherein the long pin is normally positioned on the rear side of each sectional space. One or more of the removable sectional bed liners can be removed by using the light duty vehicle and the pins to slide the removable sectional bed liners out of each of the sectional space. Operationally, the long pin can be disengaged from the tender, and used as a stake, therein to anchor the removable sectional bed, typically by lanyard—nominally a chain, to a ground position. The removable sectional bed is pulled out of the tender as the light duty vehicle liner pulls the tender away.

The overlying supporting elements are parallel to the left and right sides of the apparatus. The at least one overlying supporting element are orthogonally aligned with the at least one rear side vertical bars, and overlay an interior flange of the straight portions the left and right runners. Openings between the set of horizontal and vertical bars create at least two rear slots for positioning each of the removable sectional liners. Each removable sectional liner can, independently, be slid in from the rear, either all the way or only partially, where it is secured therein, for example by a locking pin. When all the removable sectional liners are in position in the apparatus, all the sectional spaces are covered, and the mesh is completely covered. When the apparatus is towed, the collected manure piles up on the removable sectional liners, and, as such, it can be moved to a new location, where the manure can be deposited or distributed.

BRIEF DESCRIPTION OF THE DRAWINGS

The foregoing invention will become readily apparent by referring to the following detailed description and the appended drawings in which.

DETAILED DESCRIPTION OF THE INVENTION

The invention is an apparatus that facilitates farming, and more particularly the care of pastures and paddocks. The apparatus enables biomass, and, in particular equine manure, to be collected without damaging the grass. Because of its capability to pick up materials without cutting the grass, it can also be used to collect nuts, loose leaves, pine cones, rocks. roots and other biomass.

The apparatus is a tender for pastures and paddocks; and the tender is a multifunctional, low maintenance novel sled-like farm implement, that when towed across a pasture, a paddock, a dirt track, or a field, it can be configured to process the manure (biomass), and more particularly equine manure, into a fine granular material and spread it over a large wider elongate area, where as a granular material it will be quickly incorporated by a grassy pasture as fertilizer.

Figure 1:
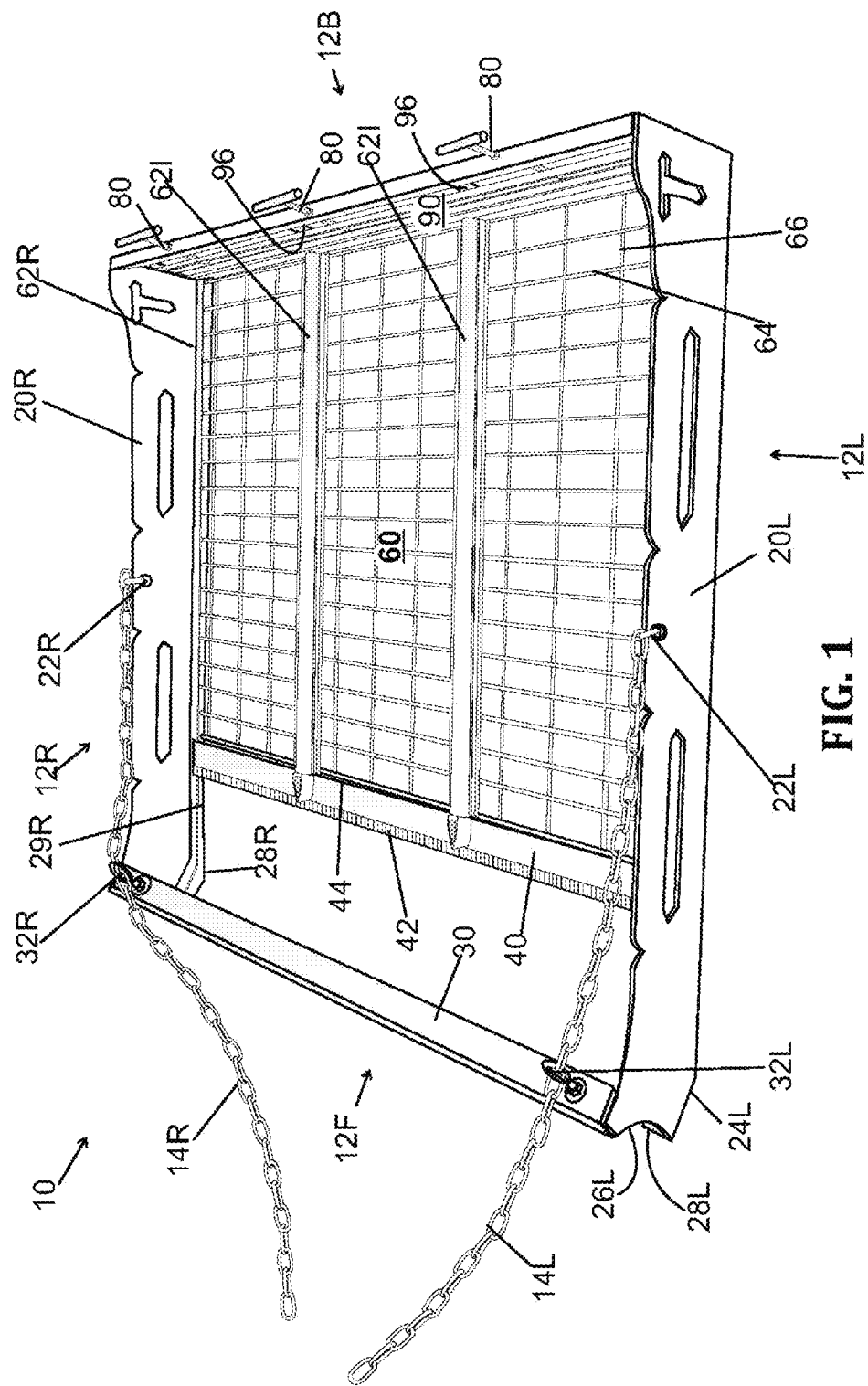
FIG. 1 is an elevated perspective side view of the invented apparatus, a paddock and pasture tender, shown without the removable sectional bed liner, revealing the wire rod mesh bottom.
Figure 4:
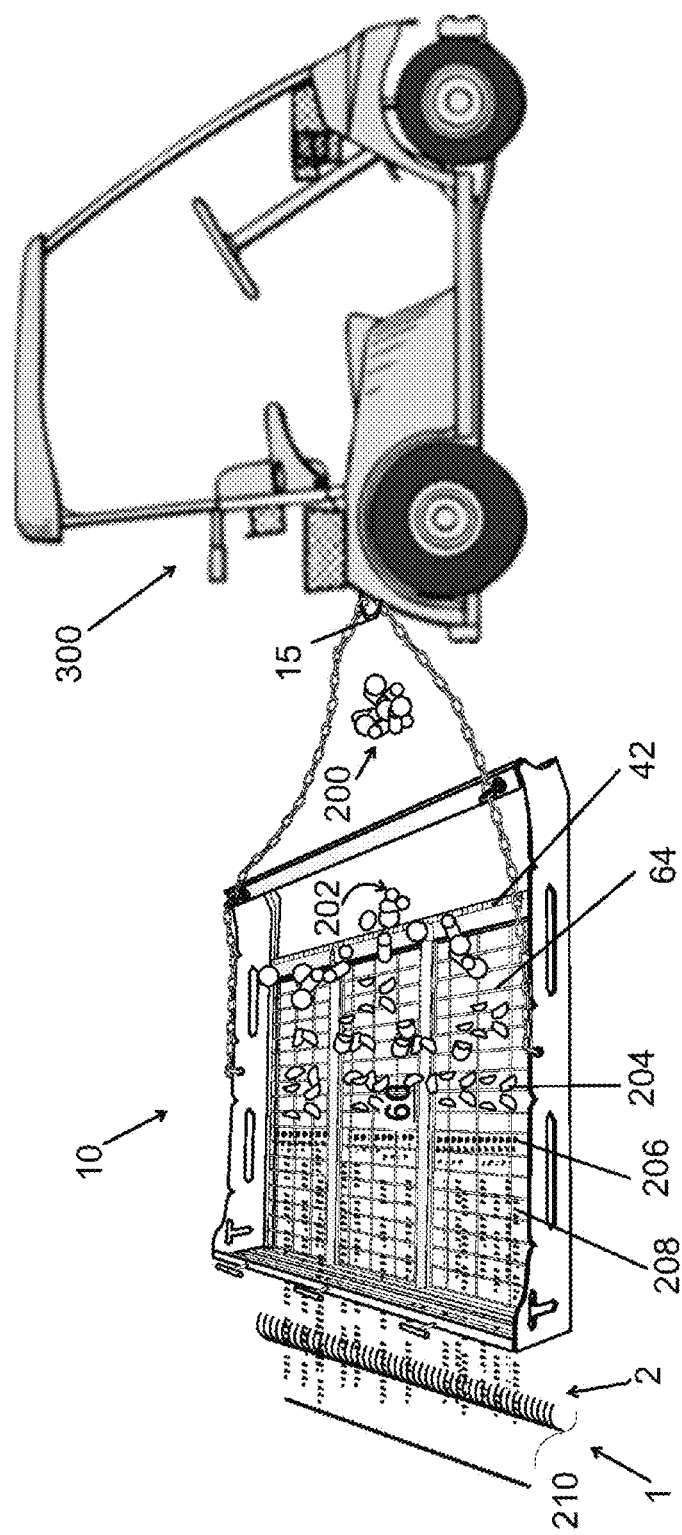
FIG. 4 is an elevated perspective side view of the tender towed by a light duty vehicle, such as a golf cart, illustrates how the invention can pick up one or more piles of equine manure, break it down into fine granules and then distribute it over a wider and elongated area.
Figure 6:
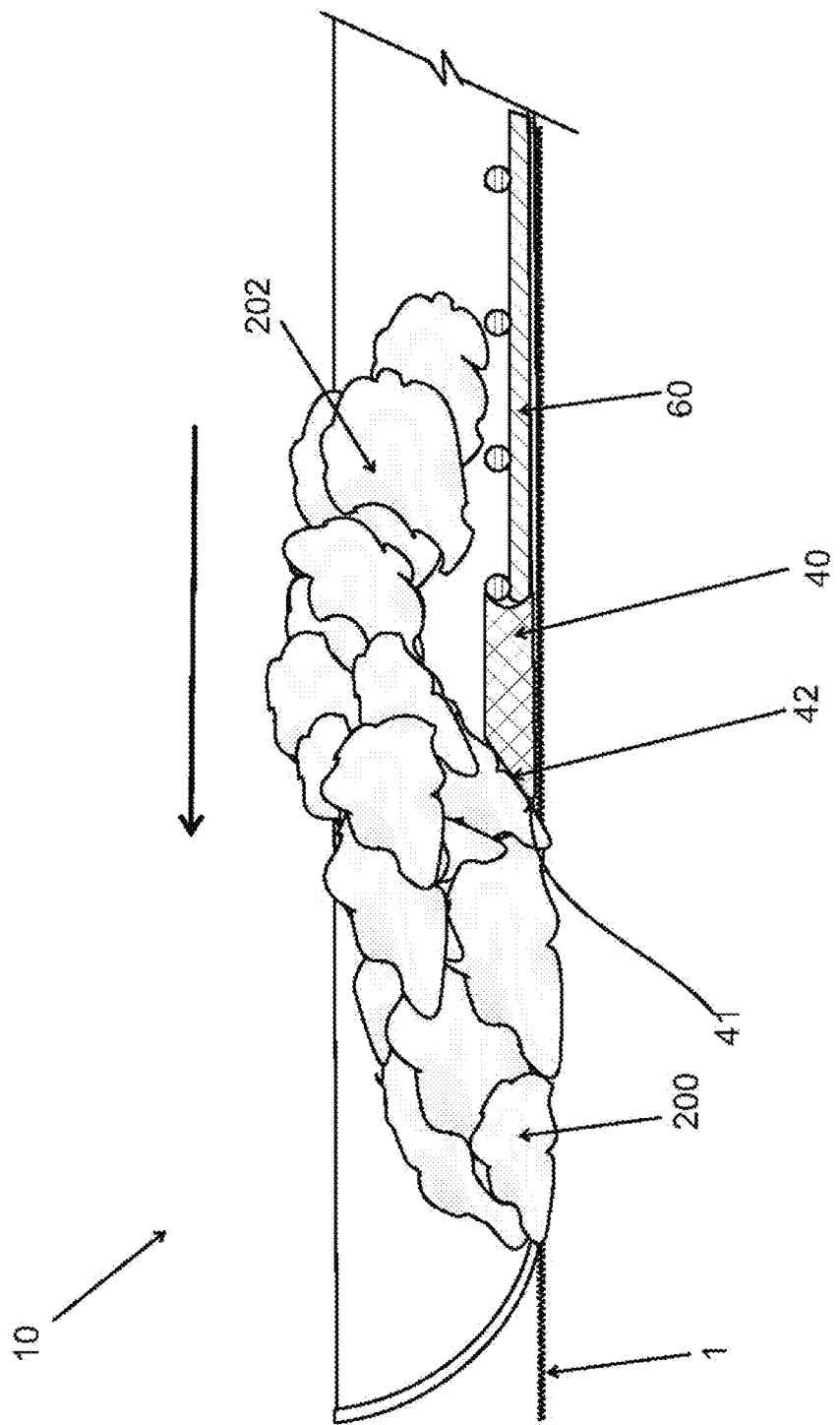
FIG. 6 is a cross-sectional view illustrating the blade and the mesh mounted on the tender's runners at the point of impact with a stool of equine manure.

The tender 10, as shown in FIG. 1, is configured to convert a stool of equine manure into a fine granular material and spread it over a large wide elongate area when the tender is towed into contact with the equine manure, as shown in FIG. 4 and FIG. 6. Most of the manure 200 is collected from the ground 1 by a blade 42 having a rounded nose edge. The rounded nose edge is selected so that it does not cut the grass, which may be present. The blade lifts the manure, and the tender slides under it, onto a bed of wire rod mesh. In the illustrated embodiment the mesh is about a #4 metal wire rod mesh. The metal wire rod mesh can be made of iron or an alloy thereof. Stainless steel has been found to be particularly suited, albeit other metals including copper, bronze, aluminum and titanium are anticipated and have certain advantages. Combination coatings, such as galvanized steel, copper clad steel, ceramic cast iron, and other coated wires are also suitable.

Movement of the tender causes the apparatus to bounce and the mesh to flex, substantially vertically. On the upper side of the mesh 60, collected manure bounces on the wire rod mesh causing the manure to break into smaller pieces. On the bottom side of the mesh, any manure that wasn't picked up is sheared and ground into granular material; and some manure is usually pushed onto the upper side the mesh. Diminution continues as the bouncing and grinding of the mesh continues, particularly by the mesh wire rods that are orthogonal to the traverse motion of the towed direction. As shown in FIG. 4, the size of the manure diminishes from 202 to 204, which generally correlates to a longer period retained on the wire rod mesh 60, as evidenced from initial collection toward the rear of the tender. Once the size is diminished into large granules, about 206, the material is no longer large enough to be retained by the mesh, and it passes to the bottom side where additional diminution is affected by shearing and grinding between the mesh and the ground. The granular material 210 is dispersed and spread over a greater width and a much elongated length.

Grass 2, as diagrammatically illustrated in FIG. 4 is bent downward, essentially combed by the tender. In FIG. 4, a golf cart 300 is towing the tender 10, fastened to a hitch 15.

The tender 10 can be used to collect manure and other materials onto the bed of the tender, and then the material can be conveyed to another location, wherein the manure can be discharged, or the manure can be spread as a grind suitable as a natural fertilizer.

Figure 2:
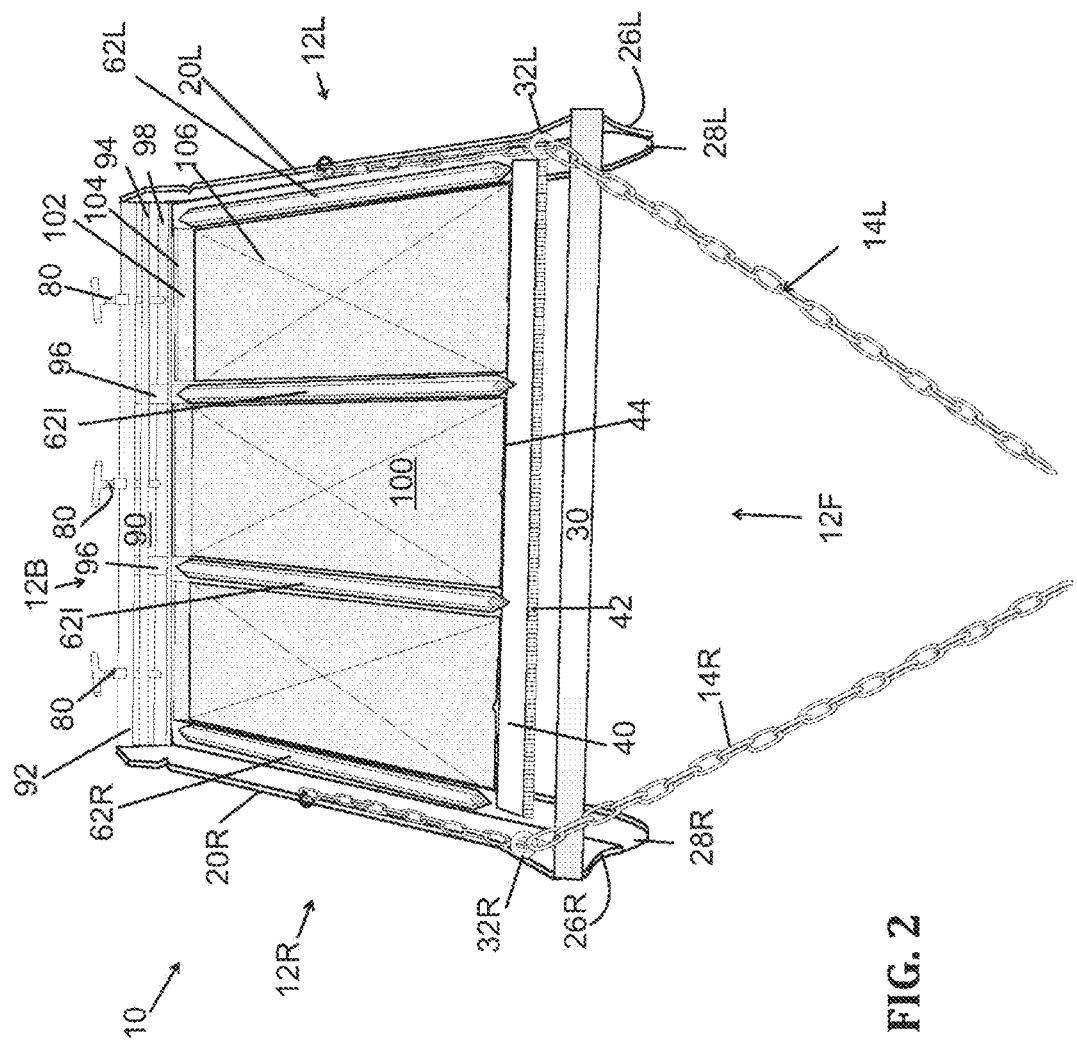
FIG. 2 is an elevated perspective front view of the tender illustrated in FIG. 1, shown with all the removable sectional bed liners.
Figure 5:
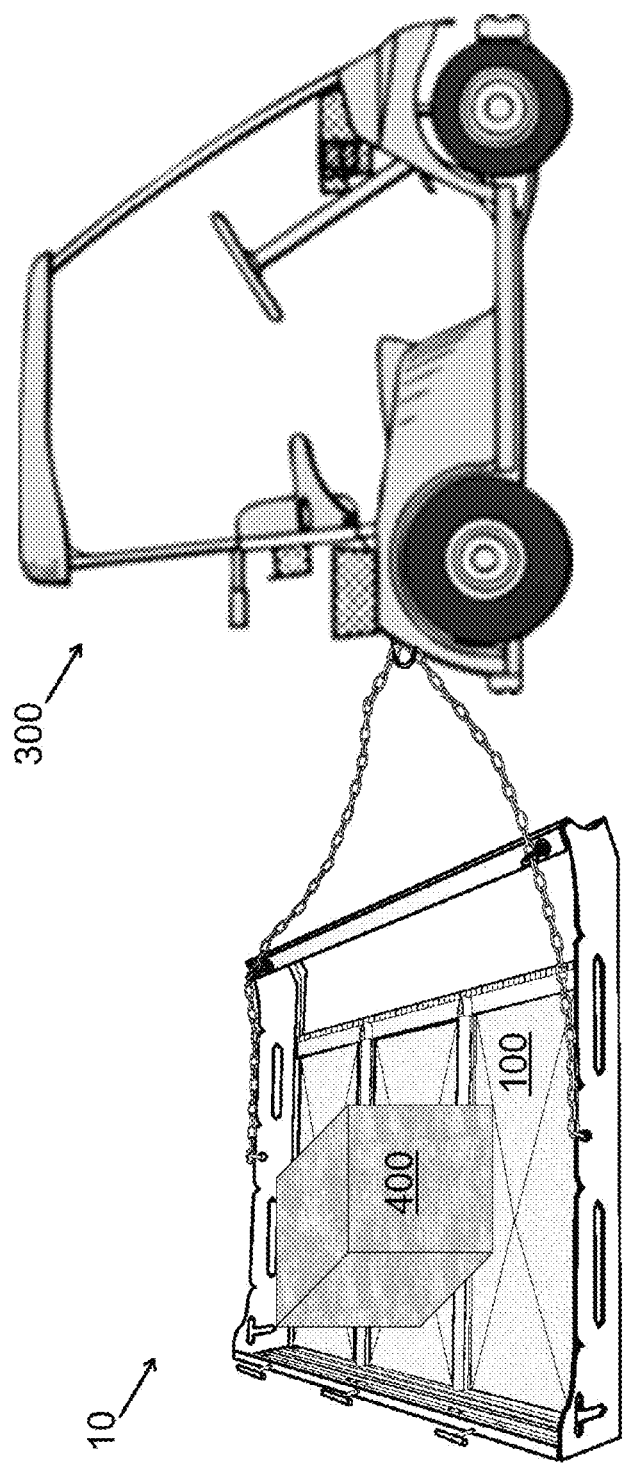
FIG. 5 is an elevated perspective side view of the tender towed by a light duty vehicle, such as a golf cart, as shown in FIG. 4, wherein all the removable sectional bed liners are in-place, and the invention can collect equine manure for movement to another site, where it can be store or spread; alternatively, the tender can be used to move other materials, such as a bale of hay or tools.

In FIG. 2, the tender has removable sectional bed liners 100 that cover the wire rod mesh 60. The tender can then be used to move materials, tools, trash, or manure using the golf cart 300 as shown in FIG. 5. In FIG. 5 the illustrated material is a bale 400.

Figure 3:
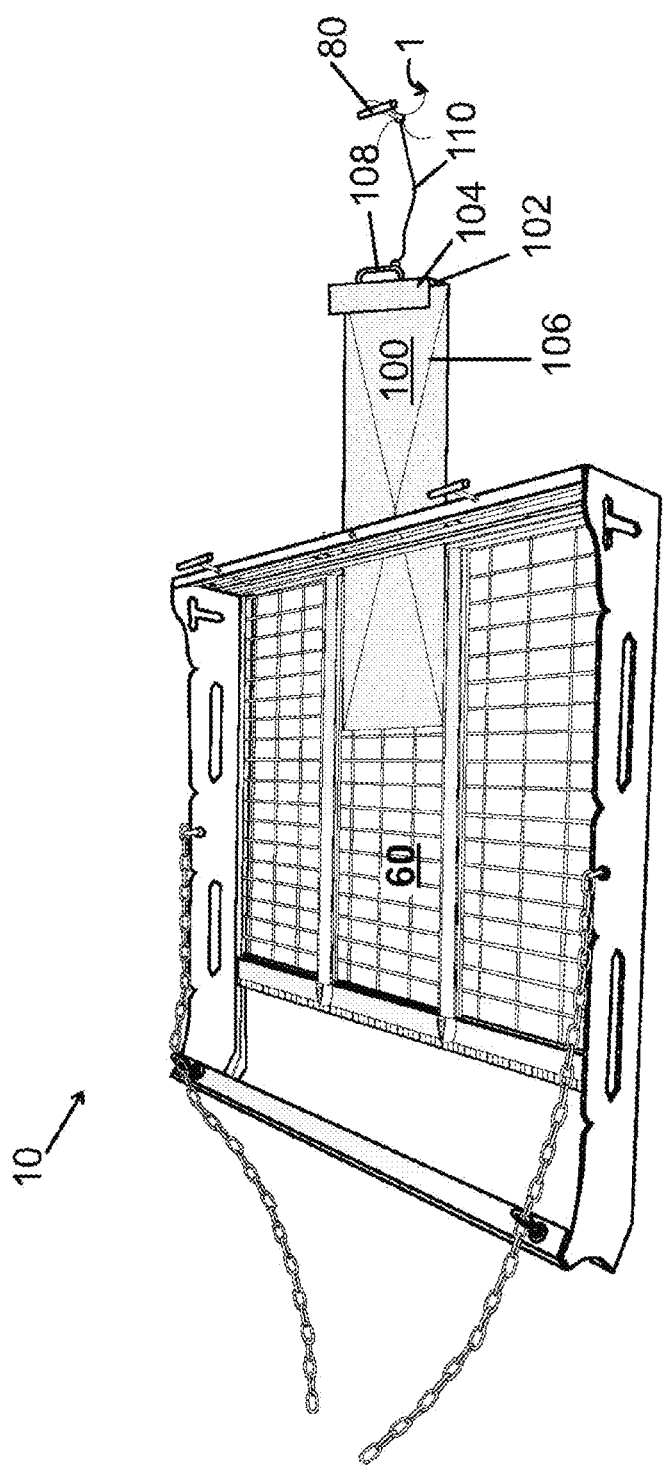
FIG. 3 is an elevated perspective side view of the tender illustrating how a multifunctional long pin can be utilized as an anchoring stake to facilitate removing a liner.

There are three removable sectional bed liners 100 illustrated in FIG. 2 and FIG. 3; and they can be removed in any order, or any number for a given tender. While the illustrated tender has three removable sectional bed liners 100, it is anticipated that another configuration may have one or another plurality of removable sectional bed liners 100. It is also possible to partially remove any given removable sectional bed liners 100, so that the removable sectional liner can be removed or partially removed, enabling the coverage to set to any desired level. This can be advantageous, if for example one wishes to recycle biomass back to the soil, but dispersed at a less concentrated rate or spread over a larger acreage. With a fraction of the removable sectional bed liners retained, a fraction of the biomass will be dispersed, and will be retained on the tender. An example of this is illustrated in FIG. 3.

In FIG. 3, about half of the center removable sectional bed liner 100 is in the tender 10. It is possible to remove a sectional bed liner by using the long pin 80 as a stake. With the sectional bed liner fully loaded, the long pin 80 is removed from the tender 10 and pushed in the ground 1 behind the tender. A lanyard 110 extends from the long pin 80 to a sectional bed liner handle 108. The tender is then towed until the sectional bed liner has been pulled out the desired distance.

When most of the sectional bed liner is pulled out, the towed tender still collects a small percentage of the manure, but most manure will be ground and spread.

Structurally, the tender 10 as illustrated in FIG. 1, is a rectangular robust frame 11, wherein the frame 11 includes a left side 12L, a right side 12R, a front side 12F, a rear side 12R, an under side 12U, and a top side 12T and a floor 61. The left side has a left side panel 20L and the right side has a right side panel 20R. Each panel has a fastening means 22L,22R. As shown in FIG. 1, the illustrated fastening means are side panel eyelets located near the top edge about mid-way the length of a side panel. Each panel has elongate openings 25L,25R that are large enough and smooth enough that they can serve as handles so that the tender can be lifted by hand.

As shown in FIG. 1, the bottom edges of the left side panel and the right side panel 20L,20R have sled runners 28L,28R. The left and right runners 28L,28R each have a longer straight section 29L,29R and a forward short section 27L, 27R that curves upward following the curvature of the forward bottom edge 24L,24R of the side panels 20L,20R. The forward short section of the left and right runner curves upward, similar to the tip of a ski, imparting lift and promoting planing over projecting rocks, etc. The tip of the left forward short section 27L and the tip of the right forward short section 27R can easily be seen in FIG. 2. The longer straight sections 29L,29R of the left and the right sled runners 28L,28R have an upper interior-side that function as the left and right framing sides of the frame for a rod wire mesh 60 that is a floor of the tender 10.

The horizontal strength element 30, shown as an "L" shaped bar (i.e., angle iron) spans from the left forward edge 23L and the top edge 21L of the left side panel 20L to the right forward and top edges of the right side panel 20R, therein providing support for the left and right elongate structural flat side panels 20L,20R. The horizontal strength element 30 strengthens the front side 12F of the tender. The L shaped bar has a left and a right side guiding means 32L,32R, which in the illustrated embodiment are eyebolts through which can pass a flexible strength element 14L,14R (i.e. a chain, a chord or cable) that is connected to the corresponding left and right panel eyelets 22L,22R on the elongate structural flat side panels 20L,20R. The angle between an eyebolt and a panel eyelet is acute, maintaining that the apparatus is towed (by the chain, chord or cable) at an acute angle, where the acute angle is close to being planar with the ground. If the panel eyelets 22L,22R are further forward, the angle is more obtuse, and the front side 12F of the tender is more inclined to dig into the ground as the tender is towed.

Rearward of the L shaped bar 30, there is a forward horizontal multi-functional bar 40, which spans from the interior flanges of the left and right runners 28L,28R. The forward horizontal multi-functional bar has a leading edge portion 42 that is beveled, forming a heavy duty blade, and a trailing edge portion 44, therein providing a forward support for the frame for the wire rod mesh 60 on the bottom.

The rear side 12B of the rectangular robust frame 11, as shown in FIG. 2 includes a set of rear-side bars 90 that can include an upper L shaped horizontal rearward bar 92, a lower horizontal rearward flat bar 98, and at least one intermediate horizontal rearward bars 94. The set of rear-side bars span from the left side to the right side of the tender. The horizontal rearward bars are further supported by at least one vertical bar 96.

The wire rod mesh 60, supported by the frame and other elements, forms the floor having a topside 12T and an bottom side 12U, wherein the mesh size is selected to grind collected manure into of small pieces, spreading widthwise on the mesh, and then then pass through the wire rod mesh, where the small pieces are further reduced by shearing as the mesh slides over the ground or grass, and spread over an elongate area that is determined by where the tender is towed. A wire rod gauge mesh having about 2"×4" openings has been found to work. The mesh retains manure on the mesh until it breaks apart caused by the movement of the towed apparatus, and once the manure is small enough to slip through the mesh, the manure is then ground into much smaller granules caught between the ground and the bottom side of the mesh. Much of the fine grinding is a result of the mesh shearing across the ground.

The wire rod mesh is rectangular and a left side and a right side are attached to the interior flange of the left and right runners 28L,28R. A front perimeter portion is in abutment with a rear edge 44 of the forward horizontal multi-functional bar 40, and a rear perimeter portion of the mesh is in abutment with a front edge of the lower horizontal rearward flat bar 98.

The tender's floor 61, as shown in FIG. 1 and FIG. 3 includes at least one overlying supporting elements 62I that are hat channel bar that prevents the mesh 60 from being deformed. The overlying supporting elements partitions the floor 61 into at least two sectional spaces, where each sectional space defines a rectangular portion of the mesh that is covered when a removable sectional liner is positioned fully forward. The overlying supporting elements are parallel to the left and right sides of the apparatus. The supporting elements are orthogonally aligned with the vertical bar 96, which functions as stanchions for the back-side 12B. In one embodiment as shown bar in FIG. 2, the vertical bars 96 are fabricated using tube steel, to keep the cost and weight down.

The interior flange of the left and right runners 28L,28R provide side support for the wire rod mesh. The wire rod mesh 50 is overlaid on the left and right sides with overlying supporting elements 62L,62R that are hat channel bar. The left hat channel bar 62L is obscured in FIG. 1, but can easily be seen in FIG. 2. The space between the vertical bars 96, the horizontal bar 98, the tender floor 61, and the side panels 20R,20L creates at least two rear slots for positioning each of the removable sectional liners 100. In the illustrated embodiment in FIG. 2 there are three slots and three removable sectional liners 100.

Each removable sectional liner can, independently, be slid in from the rear, either all the way or only partially, where it is secured therein, for example by a locking pin 80. When all the removable sectional liners are positioned, all the sectional spaces are covered, and the mesh 60 is completely covered. When the tender is towed, the collected manure piles up on the removable sectional liners 100, and, as such, it can be moved to a new location, where the manure 200 can be deposited or distributed.

FIG. 6 illustrates the blade and the mesh mounted on the tender's runners at the point of impact with a stool of equine manure.

The dimensions of an exemplary embodiment are as follows. The mesh 60 has a #4 gauge wire rod mesh on the bottom with openings 64,66 that are about 2"×4". The wire mesh measures about 49" wide and about 38" deep. The mesh has four overlying supporting elements 62R, 62L,62I, 62I (where R=right, L=left, and I=intermediate, that are U channel supports located from front to back about 16" on center, welded to the mesh for rigidity. The wire rod mesh is welded to the straight portions interior flanges of runners 28L,28R on both sides The wire rod mesh has a depth that is about 38 inches. The width of the mesh is about 49", and the mesh which is abutment with the rear edge 44 of the forward horizontal multi-functional bar 40 is welded to the rear edge 44.

The left side runner and the right side runner 28L,28R are angle irons that are about 2"×2"×3/16" and the front of the runners are bent so as to resemble a sled in design so the apparatus can be towed along the ground without damaging the grass. Each of the side panels 20L,20R have been formed out of an about 8"×51"×1/8" plate that is plasma cut with the logo "T" for "Tender" cut into it. The left side panel and the right side panel 20L,20R are nominally in a vertical position, creating a box-like structure to catch the manure when towed across the piles.

As best seen in FIG. 2, the rear of the tender has a set of rear-side bars 90. They can include a pair steel square tubing 96 about 1"×1" that are welded to the overlying supporting elements 62I therein providing intermediate supports between the side panels. They have a vertical orientation and are perpendicular to the hat channels 62I. There are a plurality of horizontal rearward bars that extend the full length across the back to form a box type structure, which also provides support the side panels. The U channels are about 2" in height.

A front portion of the wire mesh, about 3"×49"×1/2", the steel plate 40 has a trailing edge 44 that can be channeled, and a front edge of the mesh is welded to the trailing edge 44. The leading edge 42 is beveled, forming a rounded blade having a nose of about 1/16" radius. The beveled steel plate 40 also welded on to a topside interior flange of the left and right runners 28L,28R. This design creates a scraping-action when the tender is towed along the ground. The bevel causes the manure to lift off the ground by the movement of the towing apparatus (i.e. ATV, golf cart, etc.) as it is towed across the manure piles. When the tender is fitted with removable sectional bed liners 100, the manure is captured. When the manure moves on and under the wire mesh, the manure is ground. The wire rod mesh is about 1/4" above the ground and when the manure passes the mesh it is ground up by the forward motion of the tender against the ground.

Located in the front of the beveled cutting edge about 8" up and about 8" above is the horizontal strength element 30, which is a steel angle iron 2"×2"×3/16". The horizontal strength element 30 is welded on the right and left side panels to form the front support to the tender. This angle iron is welded in a reverse V form. An about 5/16" hole is drilled threw the angle iron, about 2" from each end on both sides, and there is an eyebolt installed. Each eyebolt 32L,32R allows the flexible strength element, which illustrated is a 1/4" zinc link chain to pass thru. Each flexible strength element is between about nine and about fifteen feet long, with twelve feet being the nominal length.

As shown in FIG. 2 the illustrated embodiment has can include three removable sectional liners, which function as removable capture plates. A removable sectional bed liner is about fourteen to fifteen inches wide and thirty seven to thirty nine inches long, and has a rear portion that is about a two to three inches high with a ninety degree break end. A preferred removable sectional liner 100 is about 14"½"× 38"×16 gauge sheet metal. As shown in FIG. 3, the liner has a rear portion 102 that is about a 2½" high with a ninety degree break end. The rear portion 102 has a handle 108 installed so the removable sectional bed liners 100 can be easily removed. A coplanar portion 104 breaks forward another ninety degrees. Each removable sectional bed liner is slightly crimped along lines 106 into triangular plates imparting rigidity, as they sit atop the wire mesh 60. They are held into position by a horizontal bar 98 that is about ½" angle iron. The horizontal bar 98 is welded to the vertical pair steel square tubing 96. Side-to-side movement is prevented by the overlying supporting elements 62R,62L,62I, 62I, which are the hat channel supports that are ⅛" above the wire mesh 60. Each removable sectional liner 100 may be removed at any time by a user providing the user the option of using the tender to transport material, such as collected manure, from one field to another or removing the plates of removable sectional liner 100. Therefore, the collected manure can be dispersed after it is harvested or while it is being harvested. In any case, an area fertilized with the recycled dispersed equine manure granular material is safe for grazing.

The illustrated tender is towed by about a ¼" link zinc chain which is about 12' in length. The illustrated chains 14R,14L are attached to the tender eyelets 22R,22L via a fastening element, such a quick link. The tender eyelets 22R,22L have a diameter that is about a ⅝" hole that is drilled at the mid-point of each of the side panels 20R,20L about 1" from the top. Attachment at about mid-point produces force that is substantially evenly distributed. The chain then travels through the eyebolts 32L,32R which are located on the top of the horizontal strength element 30 to a hook 15 (see FIG. 4), which is located in the center of the chain. A suitable length of chain is about twelve feet. This allows the rounded knife to be forced towards the ground as the tender is towed. The hook is then connected to the pulling apparatus of choice.

FIG. 6 is a diagrammatic cross-sectional view illustrating how the tender 10 picks up a stool of the horse manure 200. The blade 40 is sloped 42, having approximately a twenty five degree angle, and the edge of the blade is rounded having about a one sixteenth inch radian nose 41. The illustrated mesh is #4 gauge rod wire. Note, the mesh 60 is oriented so that the rod wire extending from front to rear is on the bottom side against the ground 1. This orientation is counter to what one would assume would be a more effective orientation, that is where the rod wire extending from front to rear is on the top side, not on the bottom side of the mesh. The Applicant discovered that when the rod wire extending from side-to-side was on the bottom side, that abraded equine manure material small enough to easily pass through the mesh was actually pushed back up onto the topside of mesh, and there it would quickly pile up on the rear of the tender. So not only is there clearance between the bottom side of the mesh and the ground, the rod wire extending from front to rear must be on the bottom side.

The bottom side of the mesh 60 is about at the same height as the bottom side of the blade 40, which is about 0.25 inches above the ground 1. The sloped blade 40 elevates the collected manure 202, which then falls on to the mesh 60. The 25 degree slope acts as scoop, not a battering ram. The collected horse manure breaks bounces, breaking down until it is small enough in size to pass through the mesh, where it is sheared against the ground.

Figure 7:
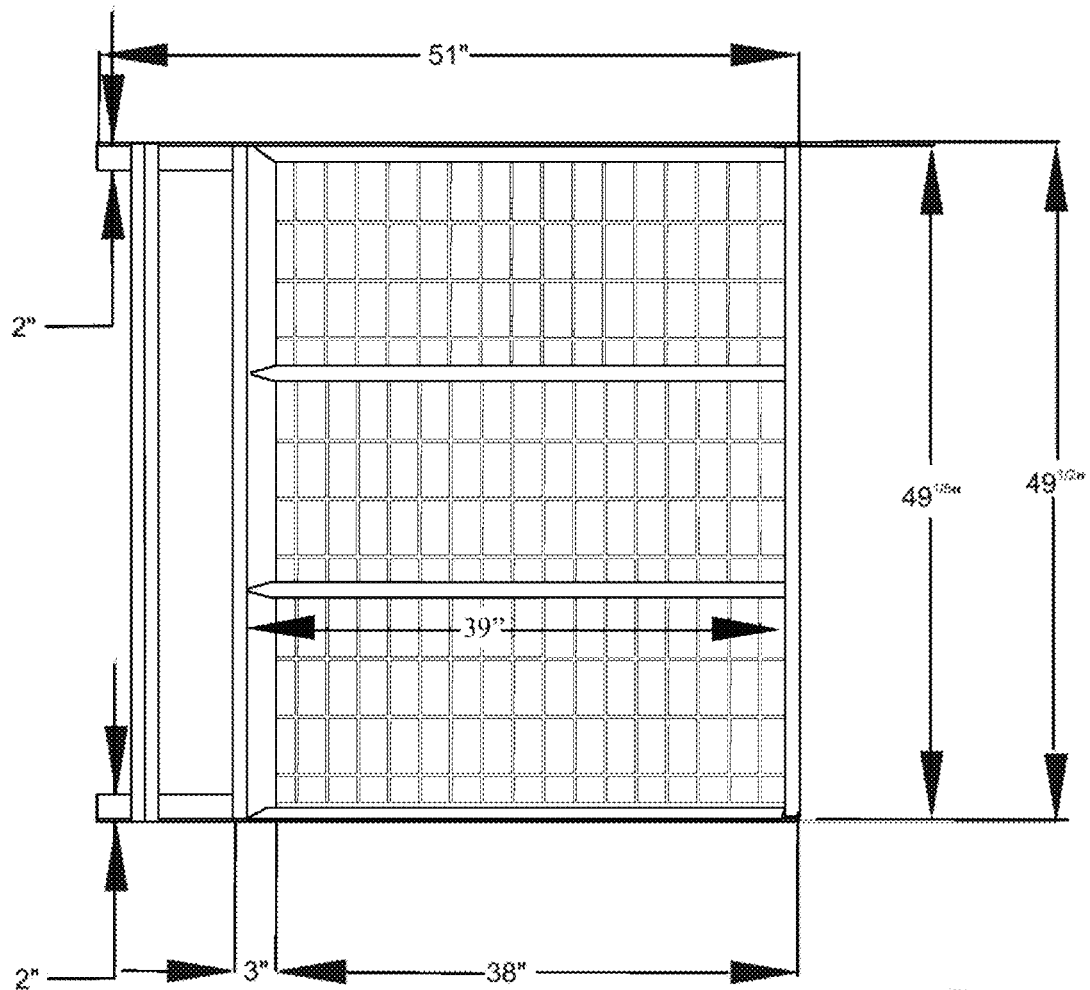
FIG. 7 is a planar view of the tender illustrating the approximate dimensions of the illustrated embodiment.
Figure 7:
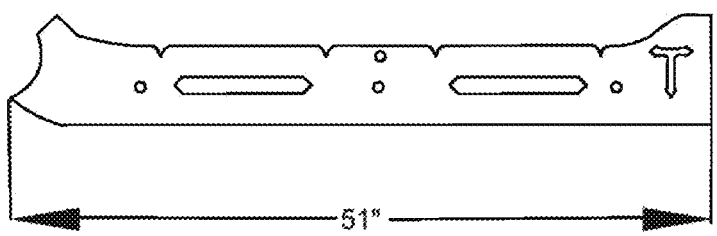

The illustrated embodiment has a plurality of approximate dimensions; and, cumulatively, they are shown in FIG. 7.

Figure 8A:
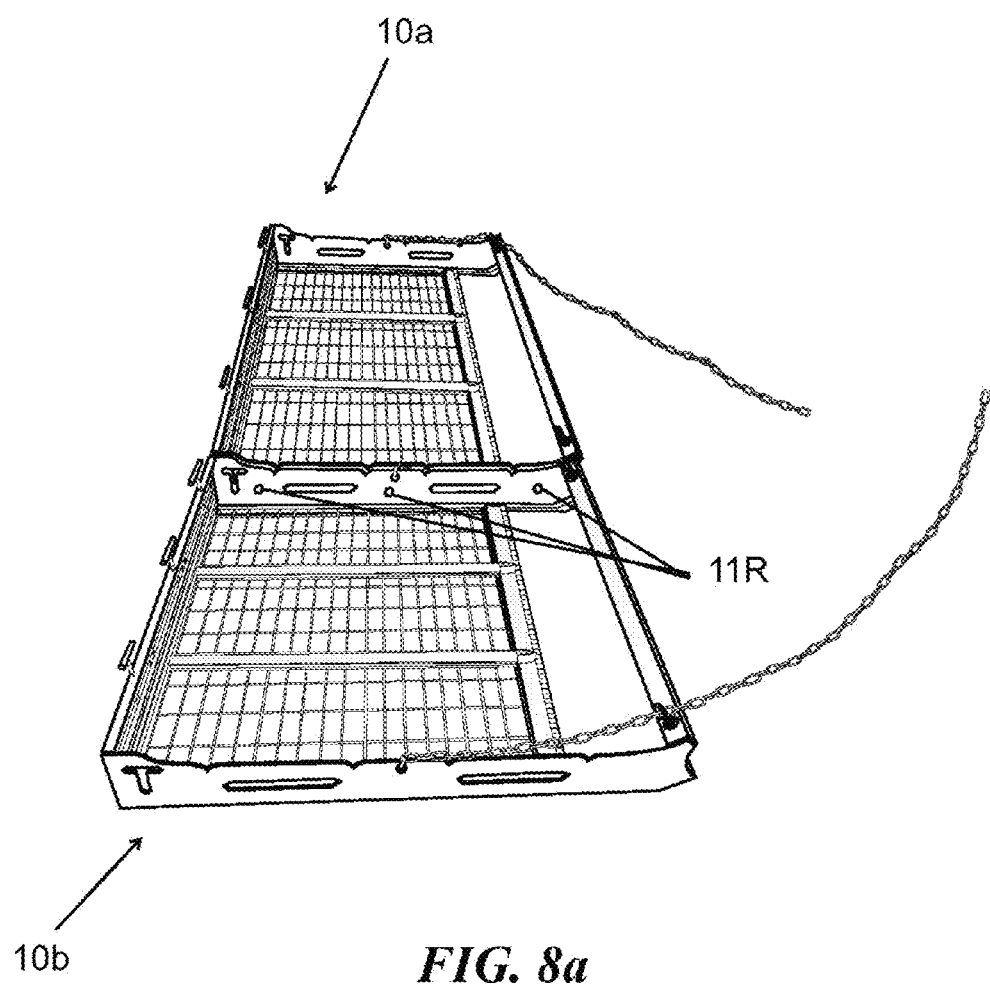
FIG. 8a is an elevated perspective side view of a pair of tenders connected side-by-side with using a lateral fastening means.

FIG. 8a is an elevated perspective side view of a pair of tenders connected side-by-side with using a lateral fastening means 11R. The flexible strength element is nominally extended, attached to the left plate of tender 10a and the right plate of tender 10b. Other connections are anticipated, for example four flexible strength elements could be connected to an elongated bumped on the towing vehicle. Twice the amount of coverage is possible using the pair of tenders connected side-by-side.

Figure 8B:
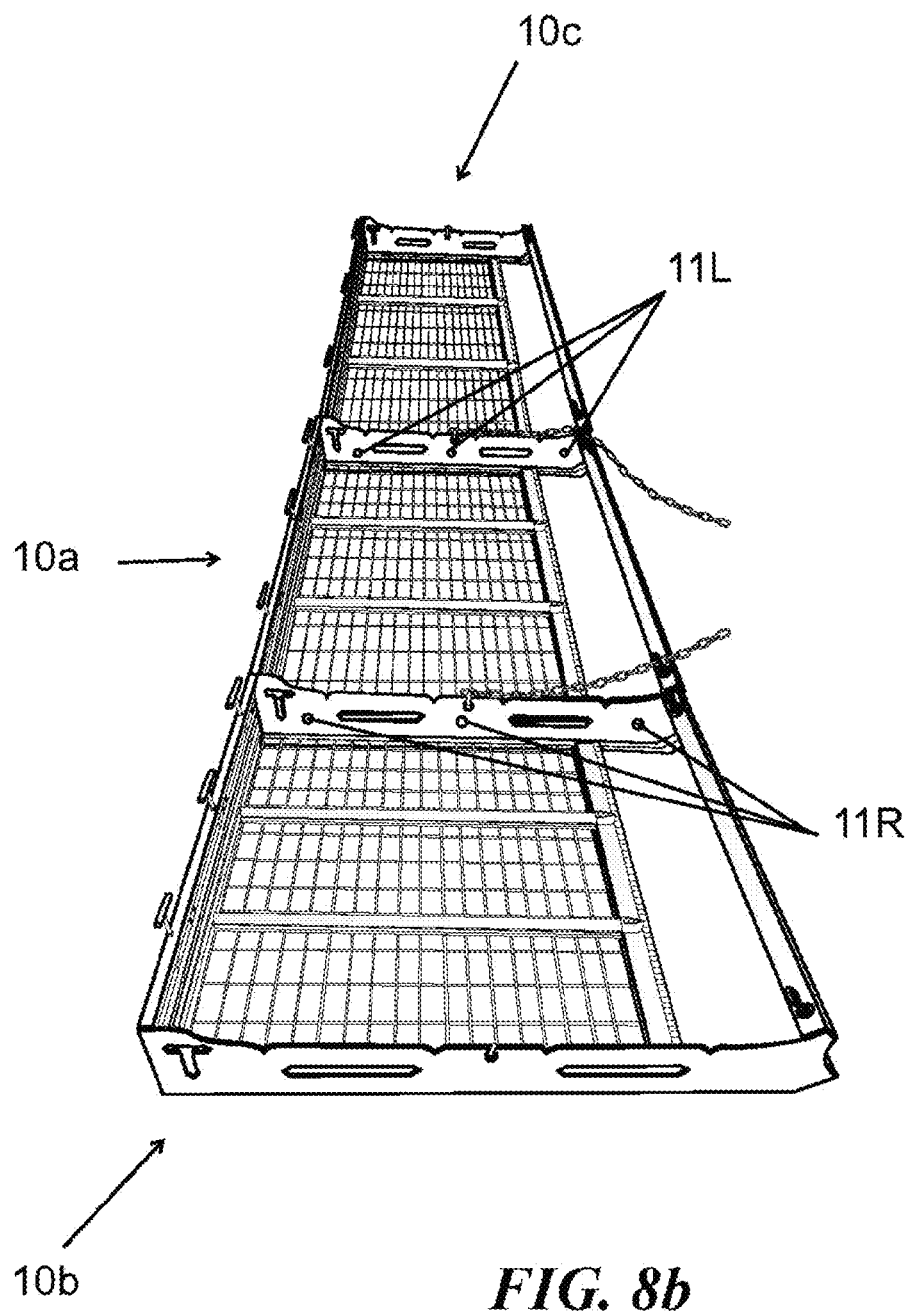
FIG. 8b is an elevated perspective side view of three tenders connected side-by-side with using a pair of lateral fastening means.

FIG. 8b is an elevated perspective side view of three tenders connected side-by-side with using a pair of lateral fastening means 11R, 11L.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus for handling biomass, and in particular equine manure, wherein said apparatus comprises:
    a rectangular robust frame, wherein the frame includes a left side, a right side, a front side, a back side, a bottom side, a floor and an open top side;
    wherein the left side of the frame is comprised of an elongate left side panel with a left bottom edge that curves upwards, a left sled runner attached to the left bottom edge of the left side panel, said left sled runner having a left straight section and a left forward upwardly turned section, a left fastening means located about mid-way in the left side panel;
    wherein the right side of the frame is comprised of an elongate right side panel with a right bottom edge that curves upwards, a right sled runner attached to the right bottom edge of the right side panel, said right sled runner having a right straight section and a right forward upwardly turned section, a right fastening means located about mid-way in the right side panel;
    a horizontal strength element on the front side that spans from a left forward edge and a left upper edge of the left side panel to the a right forward edge and a right upper edge of the right side panel, therein providing support for the left and right elongate side panels;
    a left guiding means and a right guiding means, wherein both are mounted on the horizontal strength element, wherein the left guiding means is proximate to an left end of the horizontal strength element and the right guiding means is proximate to a right end of the horizontal strength element;
    a flexible strength element threaded through the left guiding means and connected to the left fastening means, and a right flexible strength element threaded through the right guiding means and connected to the right fastening means;
    a forward horizontal multi-functional beveled bar spans from the left runner to the right runner, wherein the forward horizontal multi-functional bar has a leading edge portion that is a heavy duty blade with a rounded edge selected so that towed across grass, the grass is bend but is not cut, and a trailing edge portion provides forward support for elements attached to it;

a set of horizontal and vertical bars on the back side, wherein the horizontal bars span from a rearward end of the left side panel to a rearward end of the right side, and are further supported by at least one vertical bar;

a mesh that is about #4 gauge rod wire mesh having openings that are about two inches deep and about four inches wide, wherein a perimeter of the mesh is attached to the left and right runners, the trailing edge portion of the forward horizontal multi-functional beveled bar and a horizontal bar on the back side; and a plurality of overlying supporting elements parallel to the left and right side which provide additional support to the mesh and divide the mesh into at least two sectional spaces, wherein the floor comprises the left and the right straight sections, the mesh, the overlying supporting elements, the forward horizontal multi-functional beveled bar and a lowermost backside horizontal bar of the set of horizontal and vertical bars.

2. The apparatus according to claim 1 further comprising:
a removable sectional bed liner, wherein there is one sectional bed liner for each of the at least two sectional spaces.

3. The apparatus according to claim 1, wherein said left and right guiding means are eyebolts.

4. The apparatus according to claim 1, wherein said left and right fastening means are eyelets located proximate to an upper edge of the left and right side panels.

5. The apparatus according to claim 1, wherein said left flexible strength element is a chain, and said right flexible strength element is another chain.

6. The apparatus according to claim 1, wherein the chain is a zinc coated link chain having links that are about one quarter inch thick, and the chain has a length of about nine to about fifteen feet.

7. The apparatus according to claim 2, wherein each removable sectional bed liner is about fourteen to fifteen inches wide and thirty seven to thirty nine inches long, and has a rear portion that is about a two to three inches high with a ninety degree break end.

8. The apparatus according to claim 2, wherein said removable sectional bed liner has a rear portion with a handle, so that the sectional bed liner can be easily removed.

9. The apparatus according to claim 1, wherein said plurality of overlying supporting elements are bars, which partition the floor into at least two sectional spaces.

10. The apparatus according to claim 2, wherein said plurality of overlying supporting elements provide partitions that help secure each of the removable sectional bed liner.

11. The apparatus according to claim 1 further comprising:
a dual purpose long pin, wherein the long pin is normally positioned on the back side of each sectional space, therein securing a removable sectional bed liner, wherein said long pin can optionally be used to pull the removable sectional bed liner out of the sectional space by pulling the long pin and using it as a stake in the ground, and tethering a lanyard to the staked long pin and a handle on the removable sectional bed liner; and towing the apparatus with a light duty vehicle, therein pulling out the removable sectional bed liner that is now secured to the staked long pin.

12. A farm implement that is a tender for cleaning pastures and paddocks of stools of equine manure, wherein said tender comprises:
a rectangular robust frame with sled runners, said frame having a bottom side with a forward horizontal multi-functional beveled bar, which has a leading edge portion that is a heavy duty blade with a rounded sloped edge selected so that towed across grass, the grass is bent but is not cut, and a trailing edge portion with a mesh that is about #4 gauge rod wire mesh having openings that are about two inches deep and about four inches wide;

wherein, when towed quickly by a light duty vehicle across an area of pasture or paddock having stools of equine manure, the heavy duty blade scrapes the stools into the tender onto the mesh, where movement of the tender causes the stools to break down into small coarse pieces as they bounce on the mesh, until their size is fine enough to pass through the mesh, where the manure is sheared by the mesh into granules that are distributed over a wide area, recycling the equine manure back as a natural fertilizer for the pasture.

13. A farm implement that is a tender for cleaning pastures and paddocks of stools of equine manure, wherein said tender comprises:
a rectangular robust frame with sled runners having a bottom side with a forward horizontal multi-functional beveled bar, which has a leading edge portion that is a heavy duty blade with a rounded sloped edge selected so that towed across grass, the grass is bent but is not cut, and a trailing edge portion with a mesh that is about #4 gauge rod wire mesh having openings that are about two inches deep and about four inches wide, and fitted with a removable sectional bed liner;

wherein, when towed quickly by a light duty vehicle across an area of pasture or paddock having stools of equine manure, the heavy duty blade scrapes the stools into the tender onto the removable sectional bed liner, therein collecting the manure; and transporting the collected manure to another location where the manure can be dumped or dispersed by removing the removable sectional bed liner.

14. The farm implement according to claim 12, wherein the area fertilized with the recycled dispersed equine manure granular material is safe for grazing.

15. The farm implement according to claim 12, wherein the tender is laterally connected to a second tender.

16. The farm implement according to claim 12, wherein the tender is laterally connected to a second tender and a third tender.

* * * * *